(12) United States Patent
Hanslmeier et al.

(10) Patent No.: US 12,268,351 B2
(45) Date of Patent: Apr. 8, 2025

(54) DEVICE AND METHOD FOR INTRODUCING OPENINGS INTO A DISPOSAL BAG FOR A VACUUMING DEVICE, AND VACUUMING DEVICE

(71) Applicant: Hilti Aktiengesellschaft, Schaan (LI)

(72) Inventors: Xaver Hanslmeier, Mauerstetten (DE); Eduard Sever, Ludesch (AT); Felix Basalla, Ebhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 397 days.

(21) Appl. No.: 17/777,218

(22) PCT Filed: Nov. 11, 2020

(86) PCT No.: PCT/EP2020/081707
§ 371 (c)(1),
(2) Date: May 16, 2022

(87) PCT Pub. No.: WO2021/099188
PCT Pub. Date: May 27, 2021

(65) Prior Publication Data
US 2022/0400917 A1 Dec. 22, 2022

(30) Foreign Application Priority Data
Nov. 21, 2019 (EP) .................................... 19210540

(51) Int. Cl.
*A47L 9/14* (2006.01)
*A47L 5/36* (2006.01)
*B01D 46/00* (2022.01)

(52) U.S. Cl.
CPC ............ *A47L 9/1427* (2013.01); *A47L 5/365* (2013.01); *A47L 9/14* (2013.01); *B01D 46/0005* (2013.01)

(58) Field of Classification Search
None
See application file for complete search history.

(56) References Cited

U.S. PATENT DOCUMENTS 1,962,193 A * 6/1934 Heise ...................... B26F 1/36
 D19/72
3,961,921 A * 6/1976 Heiman ................ A47L 9/1418
 55/378

(Continued)

FOREIGN PATENT DOCUMENTS

CN 1748629 A 3/2006
CN 102245072 A 11/2011

(Continued)

OTHER PUBLICATIONS

International Search Report of PCT/EP2020/081707, Jan. 21, 2021.

*Primary Examiner* — Gabriel E Gitman
(74) *Attorney, Agent, or Firm* — Davidson Kappel LLC

(57) ABSTRACT

A device for introducing openings into a disposal bag for a vacuuming device, wherein the vacuuming device has a suction head and a collecting tank. The includes components that are configured in a manner corresponding to one another, wherein the components of the device that are configured in a manner corresponding to one another include an open structure, wherein the open structure is designed to effect pressure equalization between a first region and a second region of the collecting tank. Within the meaning of the invention, it is preferred for the proposed device to include a punch and a die, wherein the punch is arranged in the suction head and the die is arranged in the collecting tank. In a second aspect, the invention relates to a vacuuming device that includes at least one proposed device. In a further aspect, the invention relates to a method for introducing openings into a disposal bag for a vacuuming device.

12 Claims, 4 Drawing Sheets

(56) References Cited

U.S. PATENT DOCUMENTS

| | | |
|---|---|---|
| 2005/0076624 A1 | 4/2005 | Cho et al. |
| 2005/0132676 A1 | 6/2005 | Nhan et al. |
| 2011/0239399 A1 | 10/2011 | Duncan et al. |

FOREIGN PATENT DOCUMENTS

| | | |
|---|---|---|
| DE | 202004012910 U1 | 10/2004 |
| EP | 0880932 A1 | 12/1998 |
| EP | 2229859 A1 | 9/2010 |
| GB | 2141635 A | 1/1985 |
| JP | S5843357 U | 3/1983 |
| WO | WO 9712537 A1 | 4/1997 |
| WO | WO 2005082217 A1 | 9/2005 |

\* cited by examiner

DEVICE AND METHOD FOR INTRODUCING OPENINGS INTO A DISPOSAL BAG FOR A VACUUMING DEVICE, AND VACUUMING DEVICE

The present invention relates to a device for introducing openings into a disposal bag for a vacuuming device, wherein the vacuuming device has a suction head and a collecting tank.

BACKGROUND OF THE INVENTION

Various types of vacuuming devices with which dust can be sucked up in different areas of application are known from the prior art. Some of these types of vacuuming device use what are known as dust bags as disposal bags for the dust that has been sucked up. These disposal bags are frequently placed in an interior of the vacuuming device and filled with dust during operation of the vacuuming device. When the disposal bag is full, it has to be replaced with a fresh, that is to say empty, bag. To this end, the full bag is removed from the vacuuming device and disposed of appropriately.

Disposal bags are also used in what are known as construction-grade vacuuming devices, which are used for example on construction sites, in order to collect the dust that is sucked in and subsequently dispose of it. The dust that is sucked in can also be referred to as suction medium in the context of the invention. The disposal bag is preferably removable, i.e. designed to be exchangeable. Furthermore, it can be closed up to prevent the dust medium from escaping. As a result, the environment and a user of the construction-grade vacuuming device are protected from a health burden caused by the dust or the dust medium.

Conventional construction-grade vacuuming devices, as are known from the prior art, usually consist of a lower region that frequently comprises a dust collecting tank into which the disposal bag can be placed. In an upper region, construction-grade vacuuming devices comprise, in some embodiments, a suction head that can be fitted on the lower region of the vacuuming device. The suction head and lower region of such a construction-grade vacuuming device may for example be separate from one another and be fitted one on top of the other. The construction-grade vacuuming device can also be formed such that the suction head can be swung onto the lower region of the vacuuming device, however. In these cases, the suction head and the collecting tank can be connected to one another for example via a hinge or a joint.

Usually, with conventional construction-grade vacuuming devices, the disposal bags are fitted in the collecting tank of the vacuuming device, wherein a rim of the collecting tank is frequently also covered. As a result, when the construction-grade vacuuming device is closed, the bag is fixed in the collecting tank and hermetically sealed. The construction-grade vacuuming device can be closed for example in that the suction head is swung onto the collecting tank or in that the suction head is fitted on the collecting tank.

SUMMARY OF THE INVENTION

One possible way for the dust medium to be sucked in by a construction-grade vacuuming device consists in generating in the construction-grade vacuuming device a negative pressure that is used to suck dust into the dust collecting tank. The negative pressure can be generated for example by a turbine that is operated by a motor. As a result of the negative pressure, which in particular also develops in the dust collecting tank of the construction-grade vacuuming device, it is possible, however, for the disposal bag, which usually consists of a flexible, thin plastics material, to be moved or pulled in the direction of the turbine of the vacuuming device. This can negatively influence or impair the suction process of the construction-grade vacuuming device.

In order to prevent this undesired movement of the bag, expensive special disposal bags have been developed, which prevent the undesired suction of the bag by the turbine. These special disposal bags have punched openings that make it possible for no negative pressure to develop in the bag. Depending on the protection class of the vacuuming device in which they are used, the openings can be covered with a nonwoven in order to prevent the dust medium from escaping. The use of these special disposal bags is associated with high consumption costs, however, and these can result, for example, in a very long delay in replacing the bag. This can have a detrimental effect on the functionality or the lifetime of the vacuuming device, however.

It is an object of the present invention to overcome the above-described drawbacks and deficiencies of the prior art and to provide a device and a method with which it is possible to prevent the disposal bag from moving in the direction of the negative-pressure-generating turbine and impeding the operation thereof. In particular, the device to be provided is intended to allow cost-effective standard disposal bags to be used, such that advantageously the operating and consumption costs for the use of a vacuuming device that is likewise to be provided can be significantly reduced. In addition, a method for operating a vacuuming device with standard disposal bags is intended to be specified, with which the above-described drawbacks can be overcome.

The invention relates to a device for introducing openings into a disposal bag for a vacuuming device, wherein the vacuuming device has a suction head and a collecting tank. The device is characterized in that it comprises components that are configured in a manner corresponding to one another, wherein the components of the device that are configured in a manner corresponding to one another comprise an open structure, wherein the open structure is designed to effect pressure equalization between a first region and a second region of the collecting tank. In the context of the invention, the device may preferably also be referred to as a punching device. As a result of the provision of the punching device, pressure equalization within the collecting tank of the vacuuming device, or between the inside of the disposal bag and the surrounding interior of the collecting tank, can advantageously be allowed, such that the bag is effectively prevented from being sucked against the turbine. The pressure equalization is preferably made possible in that the punching device introduces openings or holes into the disposal bag when the vacuuming device is closed, wherein, as a result of these openings or holes, pressure equalization takes place between the inside of the bag and the surrounding interior of the collecting tank. As a result, normal, cost-effective dust bags can be used as disposal bags in the vacuuming device, wherein, in the context of the invention, these cost-effective dust bags are preferably also referred to as standard disposal bags. These standard disposal bags do not initially have any pre-punched openings before they are used. They are then fitted in the opened vacuuming device, wherein the bag is fitted in particular in the lower region of the vacuuming device, which preferably comprises the collecting tank. When the vacuuming device is then closed, the punch of the punching device, which is present in the suction head of the vacuuming device, is lowered into the die of the punching device, which is arranged in the lower region of the vacuuming device. As a result of the vacuuming device being closed, the material of the disposal bag is stretched over the die and pierced or perforated by the punch. The holes obtained in this way in the material of the disposal bag are preferably referred to as openings in the context of the invention. In other words, in the context of the invention, it is preferred for the device to be designed to introduce openings into the disposal bag when the suction head is fitted on the collecting tank, wherein the openings particularly effectively prevent the suction of the disposal bag by the negative pressure generated by the turbine.

In the context of the invention, it is preferred for the proposed punching device to comprise a punch and a die as components that are configured in a manner corresponding to one another, wherein the punch is arranged in the suction head and the die is arranged in the collecting tank. In other words, in the context of the invention, the components of the proposed punching device that are configured in a manner corresponding to one another can preferably also be referred to as punch and die, wherein the punch and the die are designed to introduce openings into a disposal bag that can be fitted in a collecting tank in a vacuuming device. The introduction preferably takes place by way of a punching operation that is effected preferably by cooperation of the components of the punching device that are configured in a manner corresponding to one another.

In the context of the invention, the punching device comprises an open structure, wherein the open structure is designed to effect or allow pressure equalization between a first region and a second region of the collecting tank. In other words, the wording "open structure" means that such a structure allows pressure equalization between two spatial regions with different pressures or pressure conditions within the vacuuming device. These spatial regions with different pressure conditions are referred to preferably as first and second region in the context of the invention. Preferably, there is in particular a fluidic connection between the first and the second region of the vacuuming device. In the context of the invention, the expression "fluidic connection" means preferably that a fluid exchange can take place between the first and the second region. The fluid to be exchanged is preferably a gas or a gas mixture, in particular the gas mixture present in the atmosphere, which comprises primarily oxygen (O2) and nitrogen (N2) and also small amounts of other gases and gas mixtures ("air"). The pressure equalization is symbolized by the dashed arrow in FIG. 4.

Preferably, the first region is formed between a wall of the collecting tank and the disposal bag, while the second region corresponds to the interior of the disposal bag. In the context of the invention, it is preferred for different pressure regions to develop in the lower region of the vacuuming device during vacuuming operation, these pressure regions being referred to preferably as first and second region in the context of the invention. In the context of the invention, it is also preferred for atmospheric pressure to prevail in the first region and a negative pressure to prevail in the second region during operation of the vacuuming device. The negative pressure in the second region is the cause of the undesired suction of the disposal bag by the negative-pressure-generating turbine. Pressure equalization between the two different pressure regions can take place by way of the openings that are produced by the punching device when the vacuuming device is closed, such that the disposal bag is no longer sucked by the turbine.

The expression "atmospheric pressure" is not an unclear expression to a person skilled in the art, because a person skilled in the art knows that the expression denotes the air pressure usually present in the atmosphere. This is the hydrostatic pressure of the air, which is 1013.25 hPa according to the standard. Therefore, a person skilled in the art knows that the expression "atmospheric pressure" denotes an air pressure value in this range. In the context of the invention, the term "negative pressure" denotes preferably a value that is lower than atmospheric pressure. The pressure difference that develops in the collecting tank when the vacuuming device is in operation represents preferably the difference between the negative pressure, generated by the turbine, for sucking in the dust medium and the currently prevailing atmospheric pressure. The negative pressure is present preferably in the second region inside the disposal bag and the atmospheric pressure in the first region between an inner wall of the collecting tank and an outer wall of the disposal bag. The compensation of this pressure difference is referred to preferably as pressure compensation in the context of the invention. With the proposed invention, a possible way of effecting pressure equalization between the collecting tank regions with the different pressure values can therefore advantageously be provided. As a result, the use of expensive special disposal bags can advantageously be dispensed with and the operation of the vacuuming device can be made more cost-effective.

In the context of the invention, it is preferred for the punch of the proposed punching device to have at least one opening. In the context of the invention, it is very particularly preferred for the opening to be arranged on the front side of the punch. This opening can be for example a gap. Preferably, the gap can be formed in a continuous manner and separate the front side of the punch into two separate parts (cf. FIG. 2a). The gap can also be formed in a non-continuous manner, however, as illustrated in FIG. 2b. It goes without saying that the different features of the exemplary embodiments of the invention that are shown in FIGS. 2a and 2b can be combined with one another as desired. This applies in particular to the position of the lowest point of the punch when the punch is wedge-shaped, and to the configuration of the opening in the front side of the punch. The gap contributes preferably to the formation of the open structure of the punching device and allows the pressure equalization between the first and the second region within the collecting tank, or within the lower region of the vacuuming device.

In the context of the invention, it is preferred for the die to have a rectangular basic shape and to be formed by a hollow cylinder that is open on one of its four sides. Preferably, the die is formed so as to be open on the side that points in the direction of the interior of the collecting tank or into the interior of the disposal bag. This preferably creates the open structure of the punching device, which allows the pressure equalization between the first and the second region in the collecting tank of the vacuuming device. The rectangular basic shape of the die is apparent in FIGS. 1, 2a and 2b. In the context of the invention, it is particularly preferred for the die to have its rectangular basic shape in plan view. The plan view results preferably from an observer looking at the vacuuming device from above. In the context of the invention, the spatial direction "top" or "from above" is determined preferably by the arrangement of the suction head, while the spatial direction "bottom" or "from below" is determined by the ground or for example by the arrangement of wheels of the vacuuming device (cf. FIG. 3 or 4). Accordingly, the suction head forms the top side of the vacuuming device, while the outer wall, facing the ground, of the collecting tank forms the underside of the vacuuming device.

In the context of the invention, it is preferred for the die and/or the punch to have a substantially semicircular basic shape. In the context of the invention, this means preferably that the die and/or the punch has a substantially flat or planar side wall, and a second side wall that comprises substantially a half hollow cylinder with a circular base, or is formed thereby. Tests have shown that dies and/or punches with a substantially semicircular basic shape allow a particularly good seal, such that it is easier to carry out pressure equalization with the proposed punching device.

The punch can also be in the form of a double or multiple punch. In the context of the invention, this means preferably that two or more smaller punches can be arranged preferably next to one another or in spatial proximity to one another. Preferably, in this preferred embodiment of the invention, the dies are in the form of double or multiple dies. A double or multiple die may comprise for example die ribs that separate the receptacles for the individual punches from one another. The punches may have for example a semicircular base and a beveled lower end for inserting into the die and for producing the hole in the dust bag.

In the context of the invention, it is preferred for the side of the die that points in the direction of the interior of the collecting tank to be referred to as the front side of the die. This is preferably the open side of the hollow cylinder that preferably forms the die. In the context of the invention, it is preferred for the opposite side of the die from the front side to be considered to be the rear side thereof. This is preferably the side of the die, which is preferably configured in a hollow cylindrical manner, that rests against an inner side of the collecting tank of the vacuuming device. In other words, preferably both the punch, with its opening preferably arranged on the front side, and the die, which comprises preferably a hollow cylinder with a rectangular base, wherein one side of the hollow cylinder is missing, contribute to the formation of the open structure of the punching device. Preferably, the punch and the die, as a result of their preferred configuration provided with openings, allow the pressure equalization between the first and the second region within the lower part of the vacuuming device.

In a similar manner to the die, it is also possible for two opposite sides of the punch to be referred to as the front or rear side. In the context of the invention, this means preferably that a front side of the punch faces the interior of the collecting tank, while a rear side of the punch is oriented in the direction of a side wall of the collecting tank. This orientation arises in particular in the closed state of the vacuuming device, in which the suction head has been fitted on the collecting tank of the vacuuming device. Accordingly, the vacuuming device is in an open state when the suction head is not fastened to the collecting tank or to the lower part of the vacuuming device. In the context of the invention, it is preferred for the lowest point of the preferably wedge-shaped punch to be able to be arranged in the region of the front side or in the region of the rear side.

In the context of the invention it is preferred for the punch to have a rectangular basic shape. In the context of the invention, it is particularly preferred for the punch to have the rectangular basic shape in plan view. This rectangular basic shape of the punch is apparent in FIGS. 1, 2*a* and 2*b*. A person skilled in the art knows that a rectangular basic shape can include a square base, wherein a rectangular base is substantially characterized in that the base has four sides, wherein each side encloses, at its ends, a substantially right angle with two other sides. Two opposite sides of a rectangular base are substantially the same length. The expression "rectangular base" does not exclude the possibility of the edges of the hollow cylinder being rounded.

In the context of the invention, it is preferred for the punch to be formed by a hollow cylinder that can be formed in the shape of a wedge in a lower region. The lowest point of the wedge can in this case be arranged in the region of the open side of the preferably hollow cylindrical die (cf. FIG. 2*b*). In the context of the invention, it may also be preferred, however, for the lowest point of the wedge to be arranged on the side that is opposite the open side of the preferably hollow cylindrical die (cf. FIG. 2*a*). Preferably, the position of the opening in the disposal bag can be set or varied by the position and arrangement of the lowest point of the wedge. It may also be preferred in the context of the invention for the punch not to be wedge-shaped, but rather to be in the form of a point or to comprise a point. As a result, particularly small openings can be punched in the disposal bag. Small openings preferably ensure that the pressure equalization between the two different pressure regions within the collecting tank of the vacuuming device takes place to a limited extent, such that there is only a slight negative effect on the negative pressure within the collecting tank. Furthermore, the small openings have the result that particularly little dust can pass from the inside of the collecting tank or from the inside of the disposal bag into the vicinity of the vacuuming device. This is particularly advantageous in the case of dust materials that are hazardous to health, for example toxic or carcinogenic materials.

In the context of the invention, it may be preferred for the disposal bags to be reinforced at the points at which the openings are introduced, in order to avoid any tearing of the disposal bag. Undesired tearing of the disposal bag beyond the introduction of the openings would make the disposal bag unusable. The reinforcement can be effected for example by the same material as the material from which the disposal bag is produced. In the context of the invention, it may also be preferred, however, for the disposal bag to be reinforced with a nonwoven material at the points at which the openings are introduced. As a result of the provision of a nonwoven material, the risk of undesired tearing of the disposal bag is further reduced. Furthermore, after the punching process, the nonwoven material can lie at least partially over the resultant opening and thus prevent dust from escaping from the disposal bag into the environment. A reinforcement made of nonwoven material preferably does not prevent the pressure equalization between the different pressure regions in the lower region of the vacuuming device. Moreover, the provision of the nonwoven material advantageously also does not make it difficult to pierce the disposal bag, since it is easy to cut through on account of its structure.

In the context of the invention, it is preferred for the punch to have sharpened edges in a lower region, in order to penetrate the material of the disposal bag particularly easily and in this way to allow the openings for the pressure equalization between the two different pressure regions. In the context of the invention, it is furthermore preferred for the edges to be straight (cf. FIG. 2*a*) and as a result for example to form a wedge. In the context of the invention, it may also be preferred, however, for the lower edges of the punch to be formed in a curved manner or to exhibit a curvature (cf. FIG. 2*b*). Tests have shown that particularly smooth-edged openings can be punched as a result.

In the context of the present invention, it is also possible for the punch of the proposed punching device to be arranged in the collecting tank and the die to be arranged in the suction head. In other words, the arrangement of the punch and die with respect to the collecting tank and the suction head is exactly the opposite of the previously described embodiments of the invention.

In a second aspect, the invention relates to a vacuuming device, which is characterized in that it comprises at least one proposed punching device. In the context of the invention, it is preferred for the vacuuming device to be able to have one or more proposed devices. For example, two devices can be arranged on opposite sides of the vacuuming device. As a result, advantageously more than one opening is made in the disposal bag and the pressure equalization between the first and the second region within the collecting tank of the vacuuming device can be further improved. In particular, as a result of the provision of more than one punching device, pressure equalization that is spatially particularly homogeneous can be effected. In the context of the invention, it may furthermore be preferred for punching devices to be arranged peripherally around the periphery of the suction head or of the collecting tank. The punches and dies of the punching devices may have different sizes, such that a number and a size of the produced openings can be coordinated with one another. For example, it is possible for fewer punching devices to be provided if each punching device produces a relatively large punched hole. In an analogous manner, it may be preferred for a large number of punching devices to be provided, wherein each punching device produces a relatively small punched hole. Preferably, the overall size of the openings in the disposal bag is large enough that uncomplicated pressure equalization between the first and the second region can be ensured.

In the context of the invention, it is preferred for the punches and the dies to be configured in a manner corresponding to one another. This applies in particular to the dimensions of punches and dies. In the context of the invention, it is preferred for the receiving dies to be configured to be somewhat larger in terms of dimensions than the punches, such that the punches can move or slide into the dies particularly easily. A length of the punches and/or dies may be for example in a range from 10 to 20 mm, preferably around 15 mm. A width of the punches and/or dies may be for example in a range from 25 to 45 mm, preferably in a range from 30 to 40 mm and particularly preferably around 35 mm. A height of the punches and/or dies may be for example in a range from 30 to 50 mm, preferably in a range from 35 to 45 mm and particularly preferably around 40 mm. In tests, these dimensions of punches and/or dies have resulted in particularly uniform openings, which were particularly well-suited to bringing about pressure equalization between the first and the second region within the collecting tank of the vacuuming device.

In a second aspect, the invention relates to a method for introducing openings into a disposal bag for a vacuuming device. The method is characterized by the following steps:
a) providing a vacuuming device, wherein the vacuuming device has a suction head and a collecting tank, and a proposed punching device,
b) inserting a disposal bag into the collecting tank of the vacuuming device,
c) closing the vacuuming device,
d) introducing the openings into the disposal bag by moving the punch and the die together.

In the context of the invention, it is particularly preferred, in the proposed method, for it to be possible, as a result of the use of the proposed punching device, to use standard disposal bags that can be purchased inexpensively by the user of the vacuuming device. These standard disposal bags are inserted into the collecting tank of the vacuuming device and the vacuuming device is closed by moving the suction head and collecting tank together. If the suction head and the collecting tank are connected to one another by a hinged connection, the suction head can be swung shut and as a result brought into engagement with the collecting tank. The suction connection can also be closed by fitting the suction head on the collecting tank (cf. FIG. 3). In other words, it is preferred in the context of the invention for the vacuuming device to be closed by the suction head being fitted on the collecting tank. It may also be preferred for the vacuuming device to be swung shut in order to be closed. The openings or holes are introduced into the disposal bag by the punch and the die of the punching device being moved together or cooperating.

The terms, definitions and technical advantages introduced for the punching device apply preferably in an analogous manner to the vacuuming device and the proposed method.

Further advantages will become apparent from the following description of the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
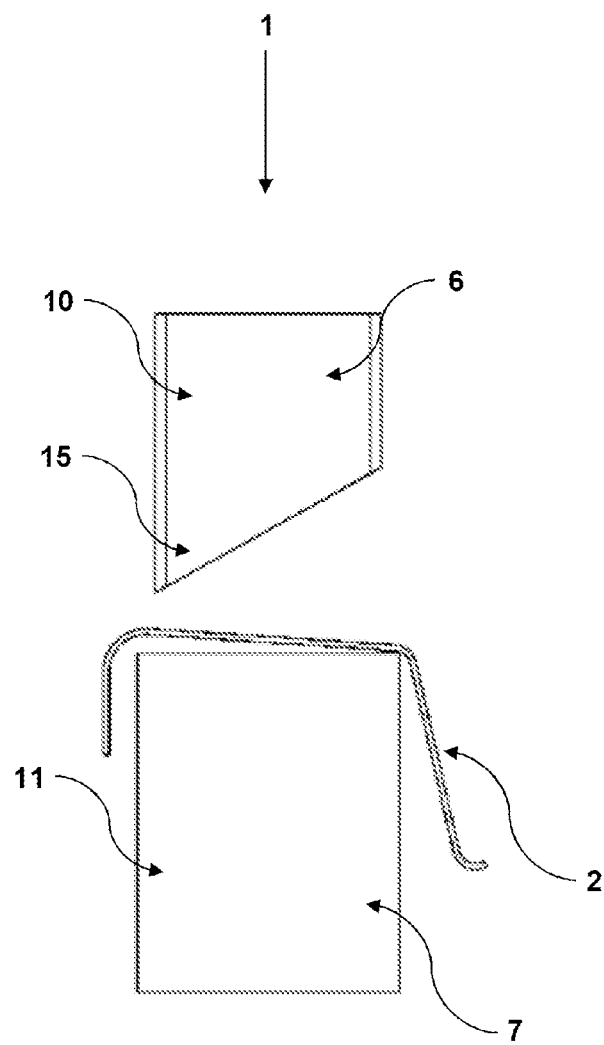
FIG. 1 shows a side view of a preferred embodiment of the punching device

FIG. 1 shows a preferred embodiment of a proposed punching device (1). In particular, FIG. 1 shows a side view of a punch (6) and a die (7), which together form a punching device (1) in the context of the invention. The punch (6) and die (7) are configured preferably in a manner corresponding to one another and each have a hollow cylinder (10, 11) as basic shape. In the context of the invention, the term "corresponding to one another" means preferably that the punch (6) can be inserted into the die (7), since the punch (6) is slightly smaller than the die (7). Preferably, the punch (6) and die (7) are configured in a manner coordinated with one another; in the context of the invention, they are also referred to preferably as "components" of the punching device (1) that are "configured with respect to one another"; in the context of the invention, they are also referred to preferably as "components" of the punching device (1) that are "configured with respect to one another". The hollow cylinders (10, 11), which preferably form the punch (6) and the die (7), have preferably a rectangular base and are matched to one another in terms of size such that the punch (6) can pass into the die (7). In other words, it is possible for the hollow cylinder (10) that forms the punch (6) to be configured in a somewhat smaller manner than the hollow cylinder (11) that forms the die (7) of the punching device (1). In particular, the die hollow cylinder (11) has somewhat longer side edges, such that the punch (6) can be inserted into the die (7) when the vacuuming device (3) is closed. The punch (6) of the punching device (1) is present on the suction head (4) of the vacuuming device (3), while the die (7) is part of the lower part of the vacuuming device (3). Preferably, the lower part comprises in particular the dust collecting tank (5) of the vacuuming device (3). It may also be preferred in the context of the invention for the punch (6) and/or the die (7), or the hollow cylinders (10, 11) of which they are formed, to have a semicircular, elliptical or oval base or a base with some other shape.

Figure 2:
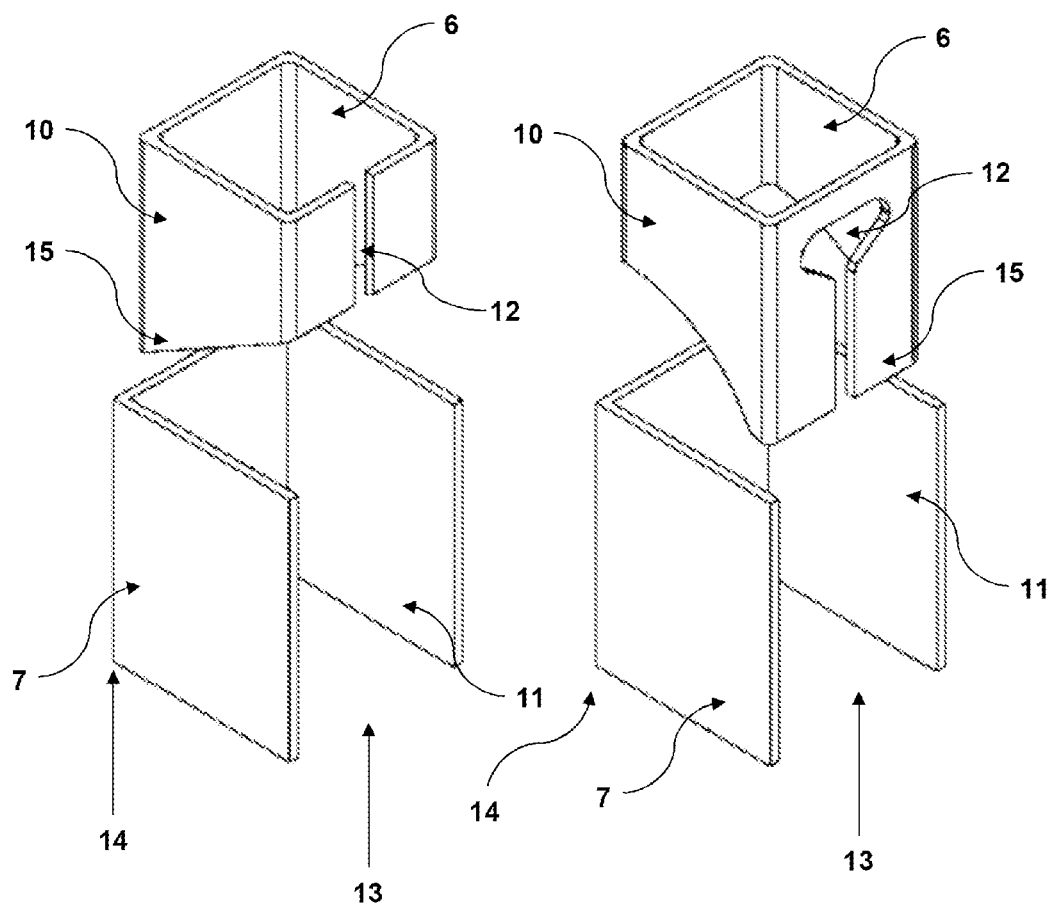
FIGS. 2A and 2B show oblique views of various preferred embodiments of the punch and die

The hollow cylinder (10) that forms the punch (6) may be in the shape of a wedge (15) in its lower region. In the context of the invention, this means preferably that the hollow cylinder (10) is configured in a longer manner on one side than on an opposite side. Preferably, the hollow cylinder (10) has, on its longer side, a lowest point, which forms the tip of the wedge (15). Preferably, this lowest point can be arranged either on the front side (13) or on the rear side (14) of the hollow cylinder (10). Corresponding configurations of the punch (6) are illustrated in FIGS. 2a and 2b. The punch (6) can pierce the material of the disposal bag (2) by way of the tip or the lowest point of the wedge (15) and in this way create the pressure-equalization opening.

Figure 3:
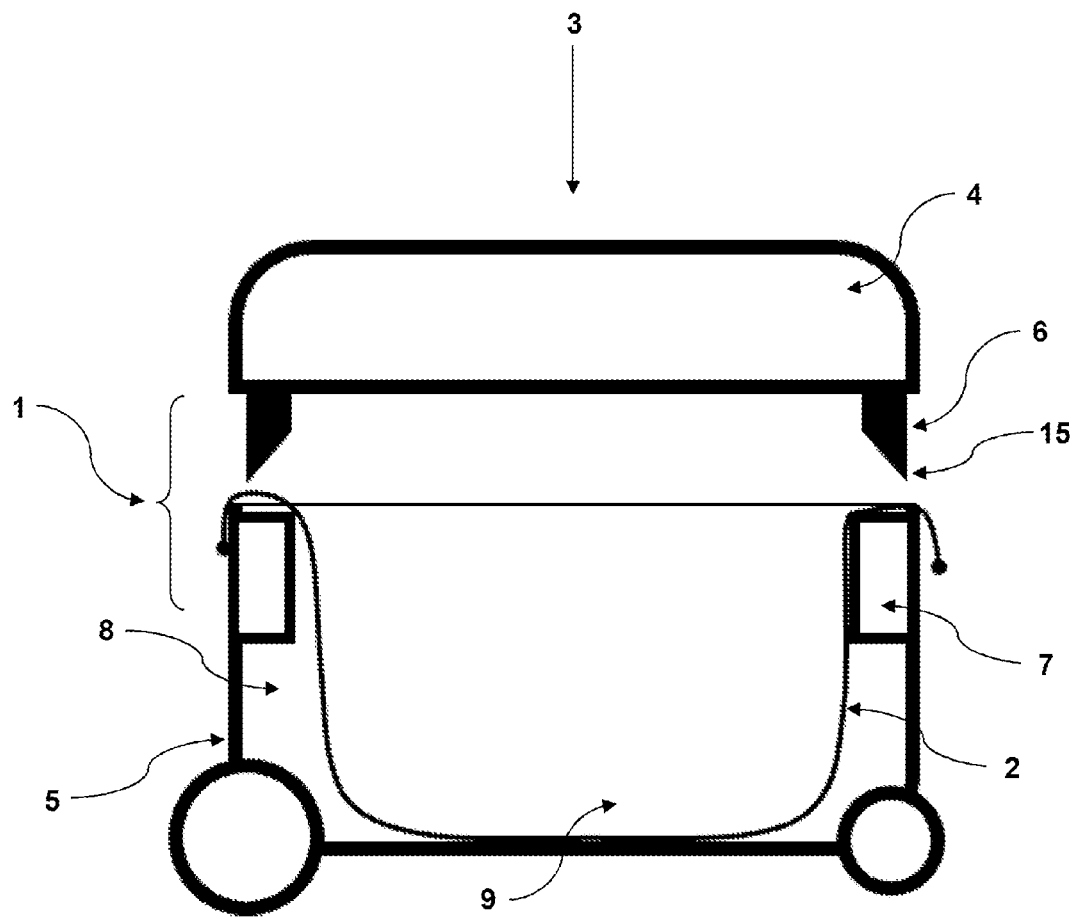
FIG. 3 shows a side view of a preferred embodiment of the vacuuming device in the open state

When a fresh disposal bag (2) is intended to be inserted into the dust collecting tank (5) of the vacuuming device (3), the disposal bag (2) is placed over the edge of the dust collecting tank (5). The vacuuming device (3) is in the open state when the disposal bag (2) is inserted, as illustrated in FIG. 3. When the vacuuming device (3) is closed, the punch (6) moves downward and moves into the die (7). This creates, in the material of the disposal bag (2), a hole or opening through which pressure equalization between the first region (8) and the second region (9) in the collecting tank (5) of the vacuuming device (3) can take place when the vacuuming device (3) is in operation.

FIGS. 2A and 2B show oblique views of various preferred embodiments of the punch (6) and die (7). The punch (6) can consist of a hollow cylinder (10) that has an opening (12) on its front side (13). The opening (12) can be continuous (cf. FIG. 2a) or non-continuous (cf. FIG. 2b). It can be formed by a gap (cf. FIG. 2a) or have a different shape (cf. FIG. 2b). Preferably, the opening (12) in the front side (13) of the punch (6), together with the open side of the hollow cylinder (11) that forms the die (7), contributes to the open structure of the punching device (1). The open structure of the punching device (1) allows the pressure equalization between the first region (8) and the second region (9) in the collecting tank (5) of the vacuuming device (3), which is indicated by the dashed arrows in FIG. 4. In particular, the open structure of the punching device (1) creates a fluidic connection between the different pressure regions (8, 9) that arise when the vacuuming device (3) is in operation. In particular a negative pressure in the second region (9) and an atmospheric pressure in the first region (8) of the collecting tank (5) oppose one another.

The hollow cylinder (10) that forms the punch (6) can be in the shape of a wedge (15), wherein the wedge (15) can be arranged on the front side (13) (cf. FIG. 2b) or on the rear side (14) of the punch (6) (cf. FIG. 2a). The lower edges of the wedge (15), or of the hollow cylinder (10) that forms the punch (6), can be configured in a straight (cf. FIG. 2a) or curved manner (cf. FIG. 2b). In the context of the invention, it is preferred for the lower edges of the wedge (15), or of the punch (6), to be sharpened such that they cut through the material of the disposal bag (2) in a particularly simple and uncomplicated manner.

The hollow cylinder (11) that forms the die (7) can be configured in a closed manner on three sides and have an open side. This open side can preferably be the front side (13) of the die (7). In the closed state, the front side (13) of the die (7) preferably faces the interior of the collecting tank (5) of the vacuuming device (3), while the rear side (14) of the die (7) is fastened to an inner side of a side wall of the collecting tank (5) of the vacuuming device (3).

FIG. 3 shows a side view of a preferred embodiment of the vacuuming device (3) in the open state. In the open state of the vacuuming device (3), the suction head (4) and the collecting tank (5) of the vacuuming device (3) are separated from one another. If the suction head (4) is fastened to the collecting tank (5) in a hinged manner, there can be a hinged connection between the suction head (4) and the collecting tank (5) in the open state of the vacuuming device (3), this hinged connection being formed for example by a hinged joint or a hinge. In other embodiments, the suction head (4) can simply be lifted off or removed from the dust collecting tank (5). The proposed punching device (1) is configured preferably in at least two parts, wherein it comprises at least one punch (6) and one die (7). The punch (6) is present in the suction head (4) and the die (7) is fastened in or on the collecting tank (5) of the vacuuming device (3). In the open state of the vacuuming device (3), the disposal bag (2) can be inserted into the collecting tank (5). In particular, a part-region of the disposal bag (2) is placed over the edge of the collecting tank in order to fasten or fix the disposal bag (2). As a result of the disposal bag (2) being inserted, different spatial regions (8, 9) are created in the collecting tank (5) of the vacuuming device (3), these corresponding to different pressure regions during operation of the vacuuming device (3). In the context of the invention, it is particularly preferred for the ambient pressure of the vacuuming device (3) to prevail in the first region (8) in the collecting tank (5), while a negative pressure prevails in the second region (9) of the collecting tank (5), this being generated by the turbine of the vacuuming device (3) during operation of the vacuuming device (3) and sucking the suction medium into the vacuuming device (3). Preferably, the second region corresponds to the interior of the disposal bag (2), while the first region (8) is formed between the outer side of the disposal bag (2) and an inner side of the collecting tank (5).

Figure 4:
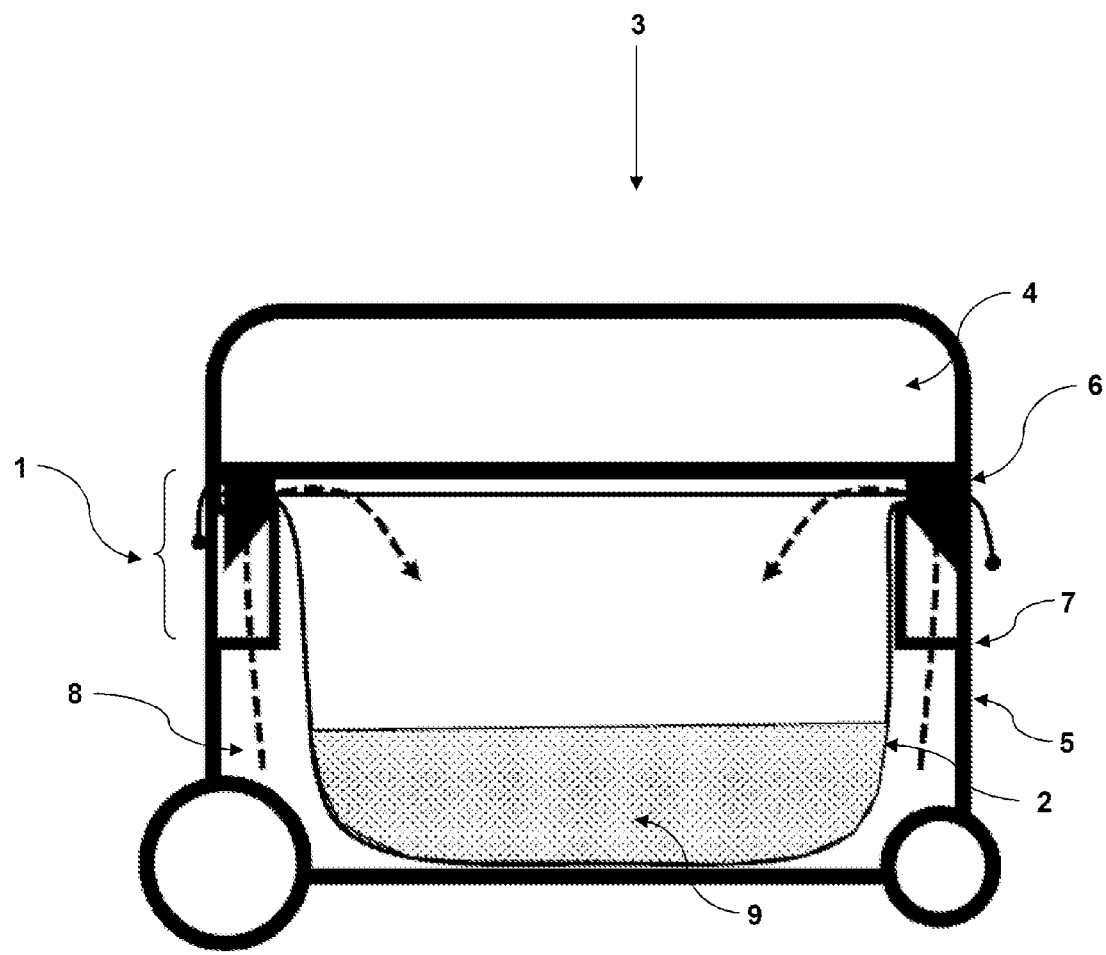
FIG. 4 shows a side view of a preferred embodiment of the vacuuming device in the closed state (operating state of the vacuuming device)

FIG. 4 shows a side view of a preferred embodiment of the vacuuming device (3) in the closed state, wherein the closed state corresponds to the operating state of the vacuuming device (3). In the closed state of the vacuuming device (3), the suction head (4) is present on the collecting tank (5). When the vacuuming device (3) is closed, the suction head (4) and the collecting tank (5) are moved toward one another, with the result that the punch (6) of the punching device (1) is inserted into the die (7). The intact standard disposal bag (2) initially rests on the die (7) and is pierced or perforated by the punch (6) of the punching device (1) when the vacuuming device (3) is closed, with the result that an opening in the disposal bag (2) is created. Preferably, the number of openings created corresponds to the number of punching devices (1) that are present. If for example two punching devices (1) are present on the vacuuming device (3), it is preferred in the context of the invention for two openings to be created for pressure equalization. The pressure equalization takes place preferably between the first region (8) and the second region (9) of the collecting tank. This is indicated in FIG. 4 by the dashed arrow, which points from the first region (8) to the second region (9). The direction of the arrow indicates that the pressure equalization takes place in that a fluid passes from the first region (8) into the second region (9). A fluidic connection between the two regions (8, 9) is provided advantageously by the open structure of the punching device (1), which is formed in particular by the opening (12) in a front side (13) of the punch (6) and an open side in the hollow cylinder (11) that forms the die (7) of the punching device (1). In the context of the invention, it is very particularly preferred for the pressure equalization between the first region (8) and the second region (9) to take place in that a fluid, for example a gas mixture, in particular air, passes from the first region (8) into the second region (9). The direction of the gas or air flow, which preferably effects the pressure equalization, results from the pressure gradient that exists between the first region (8) and the second region (9). In particular, during operation of the vacuuming device (3), atmospheric pressure prevails between the side walls of the collecting tank and the disposal bag (2), while a negative pressure prevails in the interior of the disposal bag (2). During operation of the vacuuming device (3), dust can collect in the disposal bag (2). This dust is symbolized in FIG. 4 by the dotted, gray region.

LIST OF REFERENCE SIGNS

1 Punching device
2 Disposal bag
3 Vacuuming device
4 Suction head
5 Collecting tank
6 Punch
7 Die
8 First region
9 Second region
10 Hollow cylinder that forms the punch
11 Hollow cylinder that forms the die
12 Opening
13 Front side of punch or die
14 Rear side of punch or die
15 Wedge

The invention claimed is:

1. A vacuuming device comprising:
a suction head;
a collecting tank; and
a device for introducing openings into a disposal bag for the vacuuming device, the device including components configured in a manner corresponding to one another, the components including an open structure designed to effect pressure equalization between a first region and a second region of the collecting tank.

2. The vacuuming device as recited in claim 1 wherein the components include a punch and a die, the punch being arranged in the suction head and the die being arranged in the collecting tank.

3. The vacuuming device as recited in claim 1 wherein the first region is formed between a wall of the collecting tank and the disposal bag and the second region corresponds to an interior of the disposal bag.

4. The vacuuming device as recited in claim 2 wherein atmospheric pressure prevails in the first region and a negative pressure prevails in the second region during operation of the vacuuming device.

5. The vacuuming device as recited in claim 1 wherein the device is designed to introduce openings into the disposal bag when the suction head is fitted on the collecting tank.

6. The vacuuming device as recited in claim 2 wherein the punch has a rectangular cross-sectional shape.

7. The vacuuming device as recited in claim 2 wherein the punch is formed by a hollow body formed in a shape of a wedge in a lower region.

8. The vacuuming device as recited in claim 2 wherein the punch has sharpened edges in a lower region.

9. The vacuuming device as recited in claim 2 wherein the die has a rectangular cross-sectional shape.

10. The vacuuming device as recited in claim 9 wherein the die is formed by a hollow body open on one of four sides.

11. The vacuuming device as recited in claim 2 wherein the punch has an opening in a side wall.

12. A method for introducing openings into a disposal bag for a vacuuming device, the method comprising the following steps:
a) providing the vacuuming device as recited in claim 2,
b) inserting a disposal bag into the collecting tank of the vacuuming device,
c) closing the vacuuming device, and
d) introducing the openings into the disposal bag by moving the punch and the die together.

* * * * *